(12) United States Patent
Takeda et al.

(10) Patent No.: US 6,829,232 B1
(45) Date of Patent: Dec. 7, 2004

(54) COMMUNICATION METHOD FOR TERMINALS CONNECTED TO IP NETWORKS TO RECEIVE SERVICES PROVIDED BY INTELLIGENT NETWORKS

(75) Inventors: Yukiko Takeda, Tokorozawa (JP); Tetsuro Yoshimoto, Kokubunji (JP); Satoshi Shimizu, Yokohama (JP); Shiro Tanabe, Hidaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/493,796

(22) Filed: Jan. 28, 2000

(30) Foreign Application Priority Data

Mar. 31, 1999 (JP) .......................................... 11-091267

(51) Int. Cl.[7] .............................................. H04L 12/66
(52) U.S. Cl. ...................... 370/352; 370/230; 370/401; 370/410; 370/465; 370/395.52; 709/218; 709/249
(58) Field of Search ................................ 370/230, 352, 370/353, 354, 355, 356, 401, 410, 395.52, 465, 466, 467, 475; 709/218, 249

(56) References Cited

U.S. PATENT DOCUMENTS

| | | | | |
|---|---|---|---|---|
| 5,737,333 | A | * 4/1998 | Civanlar et al. | 370/352 |
| 6,078,583 | A | * 6/2000 | Takahara et al. | 370/356 |
| 6,195,425 | B1 | * 2/2001 | Farris | 379/230 |
| 6,215,790 | B1 | * 4/2001 | Voit et al. | 370/401 |
| 6,233,234 | B1 | * 5/2001 | Curry et al. | 370/356 |
| 6,456,617 | B1 | * 9/2002 | Oda et al. | 370/352 |
| 6,470,010 | B1 | * 10/2002 | Szviatovszki et al. | 370/356 |
| 6,683,870 | B1 | * 1/2004 | Archer | 370/356 |
| 2002/0167940 | A1 | * 11/2002 | Low et al. | 370/352 |

FOREIGN PATENT DOCUMENTS

| | | |
|---|---|---|
| JP | 11-68861 | 3/1999 |
| JP | 11-068851 | 3/1999 |
| WO | 96/38018 | 11/1996 |

OTHER PUBLICATIONS

International Telecommunications Union, "Distributed Functional Plane for Intelligent Network Capability Set 2: Part 1". ITU–T Q.1224 Facsicle 1/3, extracted pages.
International Telecommunications Union, "Packeet–based multimedia communications system" ITU–T, H.323.
"Technical Terms Handbook of Communications and Networks", published by Nikkei Communications in which "MGCP" is described.
"A Framework for a Gateway Location Protocol", which is a working document of the Internet Engineering Task Force (IETF).
S. Sengodan, "A gatekeeper discovery mechanism for H. 323 systems," SPIE Conference on Multimedia Systems and Applications, Boston, MA, USA Nov. 1998.
"A Framework for a Gateway Location Protocol", which is a working document of the Internet Engineering Task Force (IETF), Oct. 28, 1998.

* cited by examiner

*Primary Examiner*—John Pezzlo
*Assistant Examiner*—Alan V. Nguyen
(74) *Attorney, Agent, or Firm*—Mattingly, Stanger & Malur, P.C.

(57) ABSTRACT

A server 3*b* for controlling a gateway 2 connecting a transport layer and an IP network has the function of accessing a service control point (SCP) 4 via a service control gateway 1*a*. A server 3 for controlling terminals on the IP network stores information of correspondence between telephone number of a terminal and the IP address. When a signal including number information which requires an access to the SCP is received from a terminal 11 managed by the server 3*a*, an interrogation request is multicasted to the other servers each having the function of accessing the SCP. A server which has sent a response signal accesses the SCP via the service control gateway to provide an IN service process.

8 Claims, 12 Drawing Sheets

To IP Network

FIG. 9

| Destination number pattern ~301 | Class ~302 | IP address ~303 | Cache ~304 | The period of validity ~305 |
|---|---|---|---|---|
| 03-????-???? | address resolution is possible at server 3a | a.b.c.d | — | — |
| 042-???-???? | address resolution is possible at server 3a | a.b.e.f | — | — |
| 3011 ⋮ | 3021 ⋮ | 3031 ⋮ | ⋮ | ⋮ |
| 0120-???-??? | address resolution is impossible at server a | z.y.x.w | a.g.h.i | 2005/11/22/04:32 |
| 090[1-8]-???-??? | address resolution is impossible at server b | z.y.v.u | a.j.k.l | 2005/10/12/12:05 |

3012, 3013, 3022, 3023, 3032, 3033, 3042, 3043, 3052, 3053

COMMUNICATION METHOD FOR TERMINALS CONNECTED TO IP NETWORKS TO RECEIVE SERVICES PROVIDED BY INTELLIGENT NETWORKS

BACKGROUND OF THE INVENTION

1. Field of the Invention

The present invention relates to a method for providing services realized by intelligent networks (IN) to a subscriber using transit telephone service based on an internet protocol (IP) network or to an originating call service from a terminal connected to an IP network in a network architecture in which an intelligent network and an IP network are connected.

2. Description of Related Art

In a public telephone network, various services are provided to the users by using the technique of the IN which can customize the service and provide service as quickly as possible. The IN is standardized by International Telecommunication Union Telecommunication Standardization Sector (ITU-T). In 1997, the IN capability set 2 was standardized (ITU-T recommendation: Q.1220–1228). The IN has a two-layer structure in which an intelligent layer is provided higher than a transport layer for performing basic call processing via a signalling network.

On the other hand, there is an active move afoot to utilize the IP network as a transit network to realize a cheap transit telephone service. A gateway having the function of converting voice to/from an IP packet and the address translating function of performing translation between telephone number and an IP address is connected between the transport layer and the IP network, thereby enabling voice service to be provided on the IP network. There is a case such that the address translating function exists not on a gateway but an independent server on the IP network.

The methods of providing an independent server on the IP network with the address translating function include the "gatekeeper method specified in H.323" which is in the process of standardization by ITU-T and the "MGCP (Media Gateway Control Protocol) method" which is in the process of standardization by the IETF (Internet Engineering Task Force) as a standardization organization of internet technologies. Further, a concept of replacing a telephone network itself with the IP network has been announced.

In the transit telephone service realized by the present IP network, however, the address translating function is concentrated on a specific device. Consequently, it is difficult to increase the function. On the other hand, even if the address translating function is dispersed to a plurality of devices, no mechanism of controlling the devices exists in the transit telephone service realized by the present IP network. Thus, networkwide service cannot be provided.

At present, the "Gateway Location Protocol (GLP)" as a method for linking the plurality of address translating servers has been started to be examined. The GLP is a protocol used to reduce a load on a server and exchanges address information so that a plurality of servers hold the same information.

Examination on a method of providing communication service by the cooperation between the service control function of the IN and the IP network has been started by ITU-T. A method of providing a service control gateway function between an IP network and the service control function of a public network, providing a call bearer gateway function between the IP network and switching system of the public network, and providing the IP network with the H323 gatekeeper function has been proposed.

The service providing method using the functions, however, has to be examined further.

SUMMARY OF THE INVENTION

In recent years, as the variety of communication services increases, it is desired that novel IP network public network linked telephone service realized by the linkage between the service control function of the IN and the IP network is provided.

For example, it is desired that the user can access services such as toll-free telephone service from a terminal using the IP network—public network linked telephone service by utilizing the service control function of the IN. For this purpose, it is necessary to access the IN function at the time of conversion between telephone number and an IP address, so that an apparatus on the IP network has to send a service request to the IN service control function and receive a service request response including a call continuous processing method (destination).

As described above, however, since the present transit telephone service using the IP network cannot provide network-wide service, services realized by the IN cannot be provided for a subscriber of the transit telephone service using the IP network and for an originating call service from a terminal connected to the IP network.

It can be considered that information or function necessary for the service control function of the IN is given to a specific independent server on the IP network having the address translation function. When all the servers on the IP network are provided with the information of the specific server, however, information of all of the servers has to be changed each time the structure of the IP network is changed.

On the other hand, when a specific device (database) is provided with the function, a load on the specific device is concentrated. Consequently, it is difficult to increase the function. It is therefore desirable to disperse the information and functions necessary for the service control functions of the IN to a plurality of specific devices on the IP network.

It is an object of the invention to propose a method of accessing the distributed information.

In the GLP being examined by the IETF at present, all of servers have correspondence information between telephone number and an IP address with respect to basic calls.

In practice, it is devised so that the amount of the correspondence information does not become too large by, for example, putting correspondence information between telephone numbers and IP addresses out of a control domain together. When the control domain is enlarged, however, there may be a server which cannot deal with the correspondence information.

It is another object of the invention to assure the connectability by compensating the server which cannot deal with the correspondence information with the correspondence information which is closer to the perfection of another higher-performance server.

In the invention, a network structure as described hereinbelow is employed.

The structure has: a first telephone network comprised of a first transport layer having a plurality of switching systems to each of which first telephone network subscriber's terminals are connected and a first intelligent layer connected to the first transport layer via an SS7; and a second telephone network comprised of a second transport layer having a plurality of switching systems to each of which a plurality of subscriber's terminals are connected and a second intelligent layer connected to the second transport layer via an SS7.

The first and second transport layers are connected to first and second IP networks via first and second gateways (or a plurality of first gateways and a plurality of second gateways). Each of the first and second gateways has the function of performing conversion between voice and an IP packet. The first and second gateways are controlled by first and second servers, respectively. The first and second IP networks are connected to an IP core network. A third gateway managed by a third server is connected to the IP core network. A third IP network is connected to the third gateway and subscriber's terminals are connected to the third IP network. The subscriber's terminals are managed by the third server.

The first and second intelligent networks have first and second service control points each having a memory for storing service control information of each user. The first and second service control points are connected to the first and second servers via first and second service control gateways, respectively.

Each of the first and second servers stores correspondence information between telephone number and an IP address of a gateway, authentication information, and usable bandwidth information. The third server stores correspondence information between an identifier (telephone number information such as address specified by ITU-T recommendation E.164) of each of terminals managed by the third server itself and an IP address, authentication information, and useable bandwidth information and, further, has information and function to start addition service provided by the IN. The first, second, and third servers construct a virtual IP control network and periodically exchange number information among them.

The correspondence information between the identifiers of the terminals managed by the third server and the IP addresses is classified into a class in which the IP address information of a device corresponding to the identifier can be unconditionally determined and a class in which the IP address information cannot be unconditionally determined. To the class in which the IP address information cannot be determined, an interrogation request is multicasted to the first and second servers, so that the range is made associated with the IP address. The range of the multicast is not limited to the above.

When an admission request signal is received prior to a call signal from a subscriber's terminal connected to the third IP network, the third server discriminates the class of destination number designated by the terminal. Specifically, the third server determines whether a specific number string (such as 0AB0, 0A0C, 0ABC) is included in the number information or not.

When the specific number string is not included in the destination number, the destination number is in the class in which the address information of a corresponding device can be unconditionally determined. In this case, the third server collates the destination number with the correspondence information between the identifier of the terminal managed by the third server itself and the IP address, derives the IP address information of the server managing the gateway to which the destination terminal is connected or the IP address information of the gateway, and transmits a response signal including the obtained information to the subscriber's terminal as a source terminal.

When a specific number string is included in the destination terminal number, it relates to the class in which the address information of a corresponding device cannot be determined. In this case, the third server multicasts an interrogation request to the first and second servers and notifies the subscriber's terminal as a source terminal of the IP address information of the server which has responded. The address information is used to specify the destination of a subsequent call setup request signal.

When a response signal to the multicasted request is received, the third server stores the address information included in the signal into a memory for a predetermined period. When similar service request is received from a terminal managed by the server within the predetermined period, a subsequent process is performed by using the stored information.

The terminal which has received the response signal including the information of the destination of the call setup request signal transmits the call setup request to the server or gateway on the basis of the received information. When the server which has responded to the multicasted request receives the call setup request from the terminal, the server checks whether the received signal requires the start of the IN function or not. When it is determined that the received signal requires the start of the IN function, the server obtains the IP address information of the service control gateway from the information stored in the memory and transmits a service request to the service control gateway.

The service control gateway transmits a service request to the service control point by using the prestored information regarding the service control point. The service control point which has received the request notifies the server of the service information corresponding the received information via the service control gateway. The server selects a proper gateway from the first and second gateways on the basis of the information received from the service control gateway and transmits a call setup request to the selected gateway.

By enabling the terminal using the IP-public network linked telephone service to access the service control point via the service control gateway directly from the server or via another server by using the information stored in the server, various services (such as toll-free telephone service) provided on the public telephone network can be provided also to the user using the IP network. The information of the server having the function of accessing the service control gateway is not provided as fixed information but is discriminated by the multicast, thereby enabling the concentration of load on a specific server to be avoided and enabling a change in the network structure to be flexibility dealt with.

By employing the method of obtaining information which cannot be derived by the conversion using the IP address— telephone number correspondence information in the server by multicasting a request to other higher-performance servers, the IP telephone with high connectability can be realized even by a low-performance server.

BRIEF DESCRIPTION OF THE DRAWINGS

FIG. 9 is a diagram showing an information table stored in a storage of a server.

DESCRIPTION OF THE PREFERRED EMBODIMENTS

Embodiments of the invention will be described with reference to the drawings.

First, a method of accessing a service control point from an IP network side via a service control gateway will be described.

Figure 1:
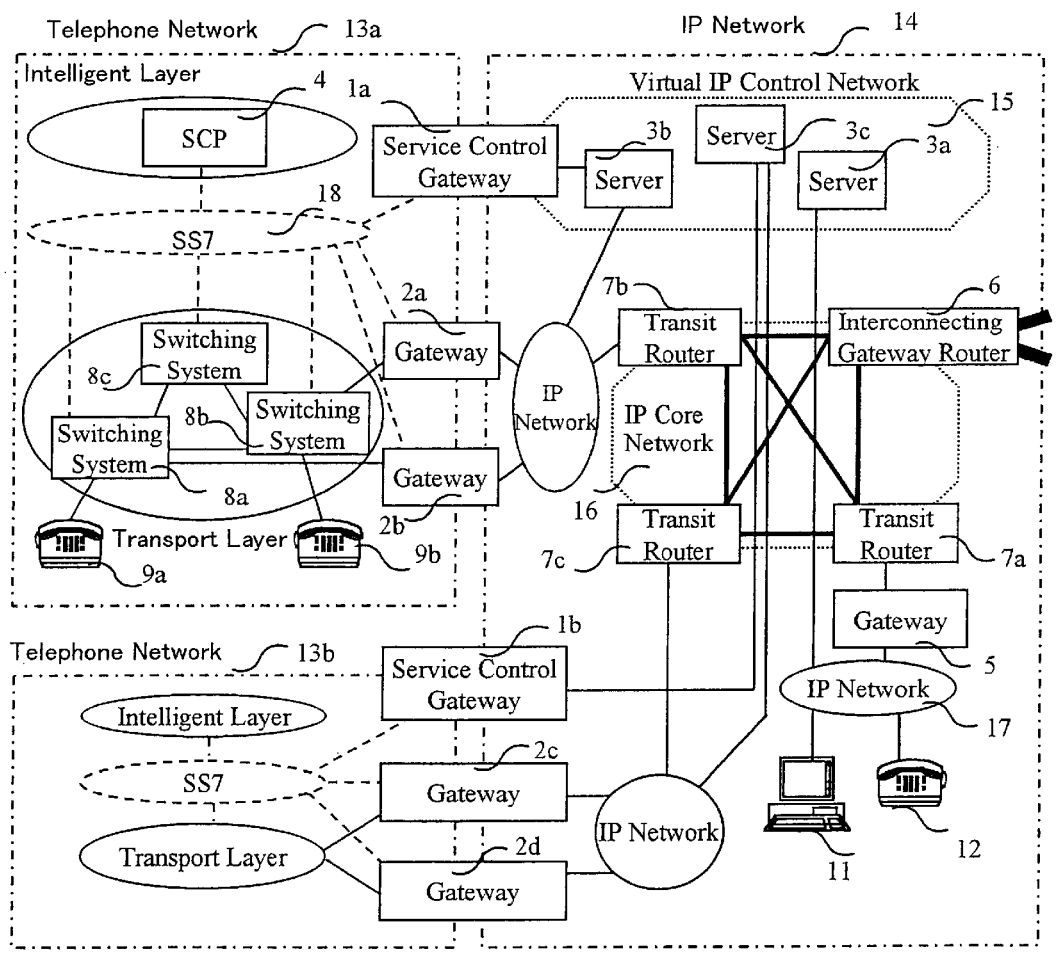
FIG. 1 is a diagram showing a network structure in which existing telephone networks and an IP network are connected.

FIG. 1 shows an example of the structure of a network in which existing telephone networks 13 (13a and 13b) and an IP network 14 is connected, to which the invention is applied.

An intelligent network has the structure in which a service control point (SCP) 4 of the intelligent network and a plurality of switching systems 8 (8a, 8b, 8c) are connected via a No. 7 common channel signaling system (SS7) 18. To the switching systems 8, subscriber's terminals 9 (9a, 9b) are connected via subscriber's lines.

The IP network 14 such as Internet and the transport layer constructed by the plurality of switching systems 8 are connected to each other via gateways 2 (2a, 2b, 2c, 2d) A server 3b for controlling the bandwidth of a gateway and address information is connected to the gateways 2a and 2b and a server 3c is connected to the gateways 2c and 2d. A service control gateway 1a is connected to the IP network 14 and the SCP 4. Another service control gateway 1b connected to the IP network 14 is connected to another SCP existing in another intelligent network. The SS7 (18) is terminated by the gateway 2. The SS7 (18) may be terminated by the server 3b.

In the IP network 14, a plurality of transit routers 7 (7a, 7b, 7c) and an interconnecting gateway router 6 are connected by using the internet protocol and form an IP core network 16. The IP network 14 is connected to another IP network via the interconnecting gateway router 6. An IP network 17 is connected to the transit router 7a via a gateway 5. Terminals 11 and 12, a server 3a and gateway 5 are connected to the IP network 17. The bandwidth and addresses of the terminals 11 and 12 and gateway 5 are controlled by the server 3a. The servers 3 (3a, 3b, 3c) build a virtual IP control network 15.

The service control gateway 1 transmits/receives a signal regarding services between the server 3 and the SCP 4 and performs translation between the IP protocol and the protocol used in the existing telephone network. The service control gateway 1 stores information for determining an SCP to be accessed and information used to authenticates the user on the basis of the information received by the server 3.

Although the service control gateway 1 is connected to the IP network and the SS7 (18) and performs translation between the IP protocol and the SS7 protocol in FIG. 1, a configuration such that the service control gateway 1 is disposed between the IP network and the intelligent network and translation between the IP protocol and the protocol in the intelligent network is performed may be also used. It is also possible to employ a configuration such that the service control gateway 1 and the SCP 4 are integrally formed and the SCP 4 directly receives information from the server 3.

The SCP 4 provides network-wide services such as number translating service represented by toll free service and customer services based on information registered for each user.

The gateway 2 has the function of IP encapsulating voice to provide voice service also on the IP network, means for transferring signal information used by the SS7 (18), and means for carrying out communications with a device in the IP network 14 by the internet protocol. Specifically, as a gateway 2, a VoIP (Voice over IP) gateway for providing internet telephone service run and managed by a communication enterprise is employed.

Figure 2:
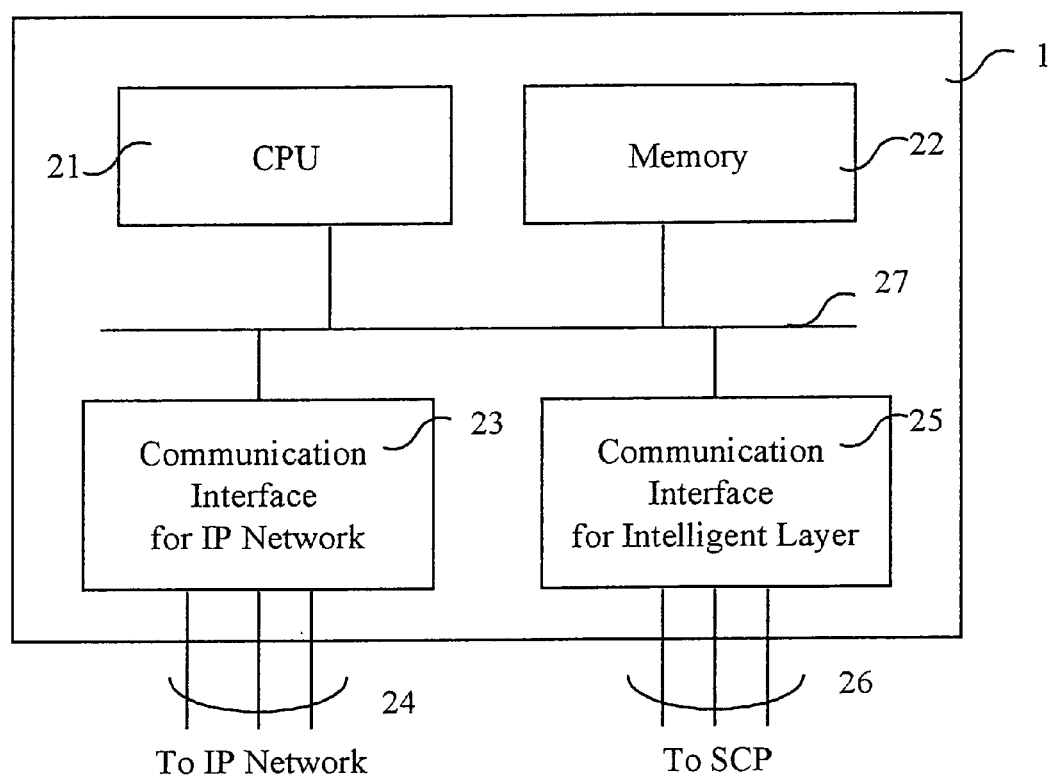
FIG. 2 is a diagram showing the structure of a service control gateway.

FIG. 2 shows the structure of the service control gateway 1.

The service control gateway 1 has the structure such that a CPU 21 for controlling a signal transmitted to/from the SCP and the gateways, a memory 22, a communication interface 23 for the IP network for terminating signal lines 24 extended from the IP network, and a communication interface 25 for the intelligent network for terminating signal lines 26 extended from the SCP are connected via a bus 27.

In the memory 22, a program for transmitting/receiving a signal to/from the server and the SCP, information necessary to access services realized by the SCP, and authentication information used to access the SCP are stored. The communication between the CPU 21 and the SCP is performed by, for example, newly creating a message used in the IN and using it. The communication between the CPU 21 and the server is performed by, for example, using the internet protocol.

Figure 3:
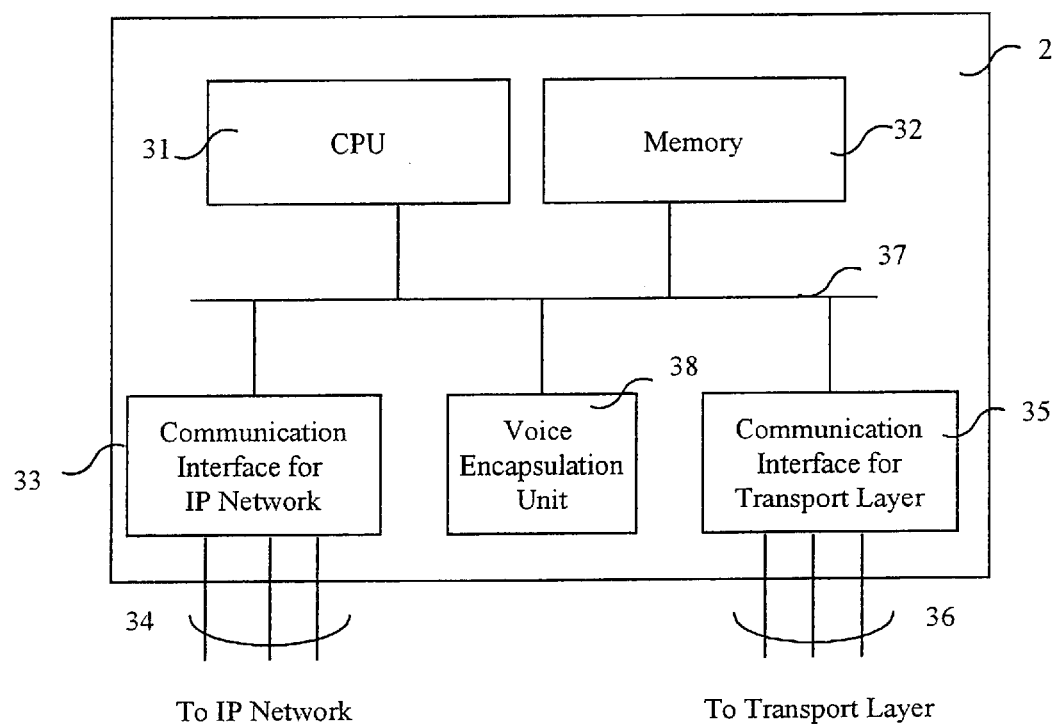
FIG. 3 is a diagram showing the structure of a gateway.

FIG. 3 shows the structure of the gateway 2.

The gateway 2 has the structure such that a CPU 31 for controlling a signal to/from an apparatus connected to the IP network and an apparatus connected to the transport layer, a memory 32, a communication interface 33 for the IP network for terminating signal lines 34 extended from the IP network, a communication interface 35 for the transport layer for terminating signal lines 36 extended from the transport layer, and a voice encapsulation unit 38 for encapsulating voice information are connected via a bus 37.

In the memory 32, a program for transmitting and receiving a signal to/from the server or router on the IP network 14 or the switching system 8 in the telephone network 13. The communication between the CPU 31 and an apparatus on the IP network is performed by, for example, using the internet protocol. The communication between the CPU 31 and the transport layer is carried out by, for example, using an ISDN user part protocol (ISUP) of N-ISDN.

Figure 4:
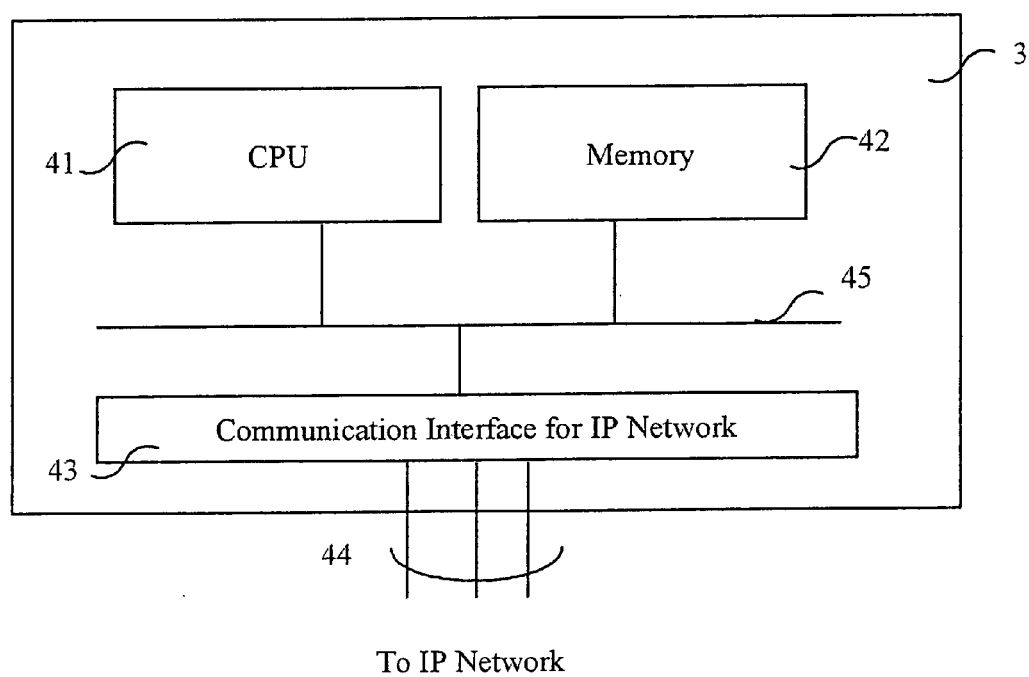
FIG. 4 is a diagram showing the structure of a server on the IP network.

FIG. 4 shows the structure of the server 3.

The server 3 has the configuration such that a CPU 41 for controlling a signal to/from another apparatus connected to the IP network, a memory 42, and a communication interface 43 for the IP network for terminating signal lines 44 extended from the IP network are connected via a bus 45.

The memory 42 stores therein correspondence information between telephone number and an IP address of each of the terminals and gateways controlled by the server 3, user authentication information, a program for performing authentication, information and a program for controlling the bandwidth, and information and a program necessary to transmit/receive signals to/from the server and router on the IP network 14. The communication between the CPU 41 and an apparatus on the IP network is performed by, for example, using the internet protocol. When the server 3 terminates the SS7 (18), the SS7 (18) interface is added to the server 3.

Figure 5:
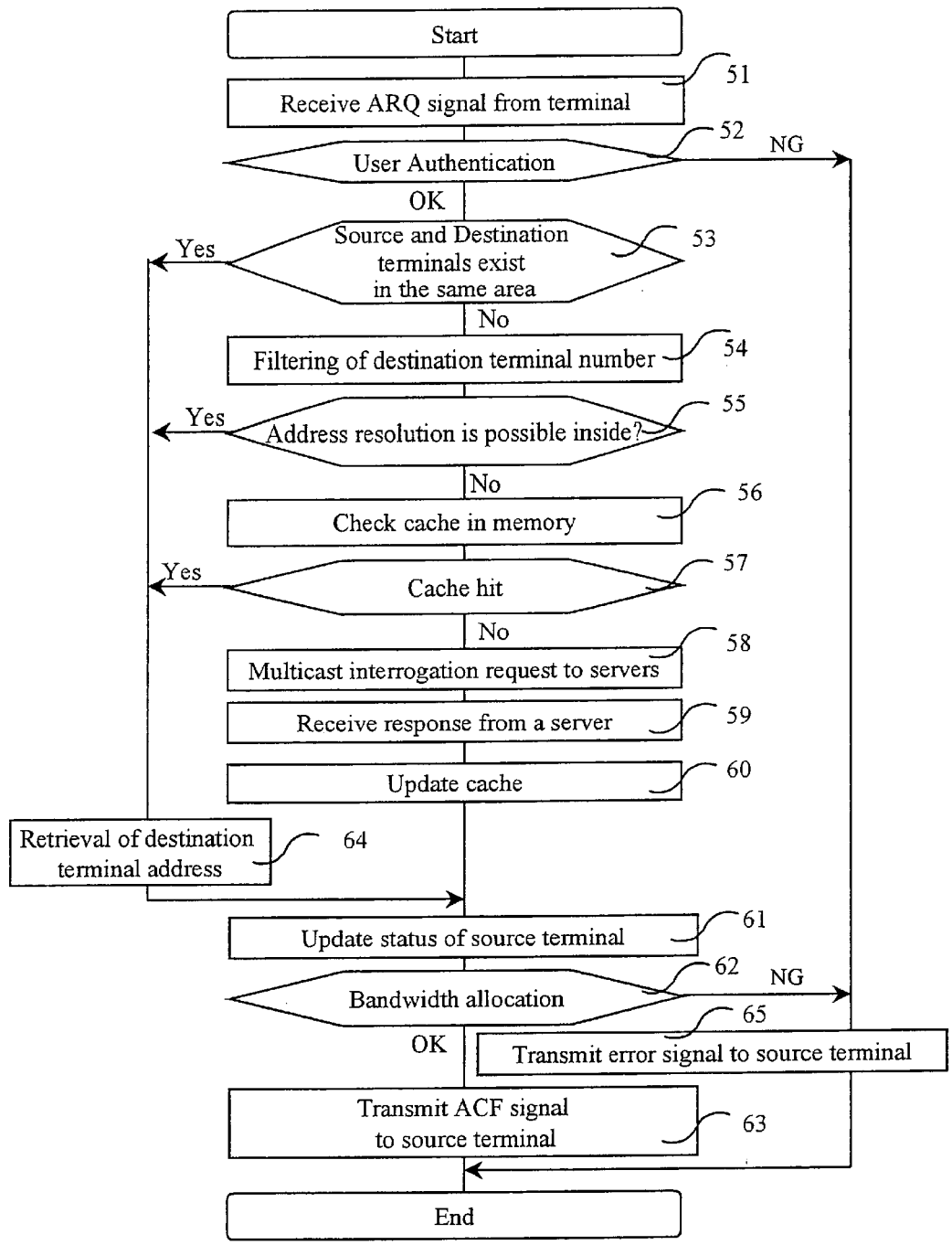
FIG. 5 is a flowchart showing processes executed by a server for managing a gateway connected to the IP network and an IP core network.
Figure 6:
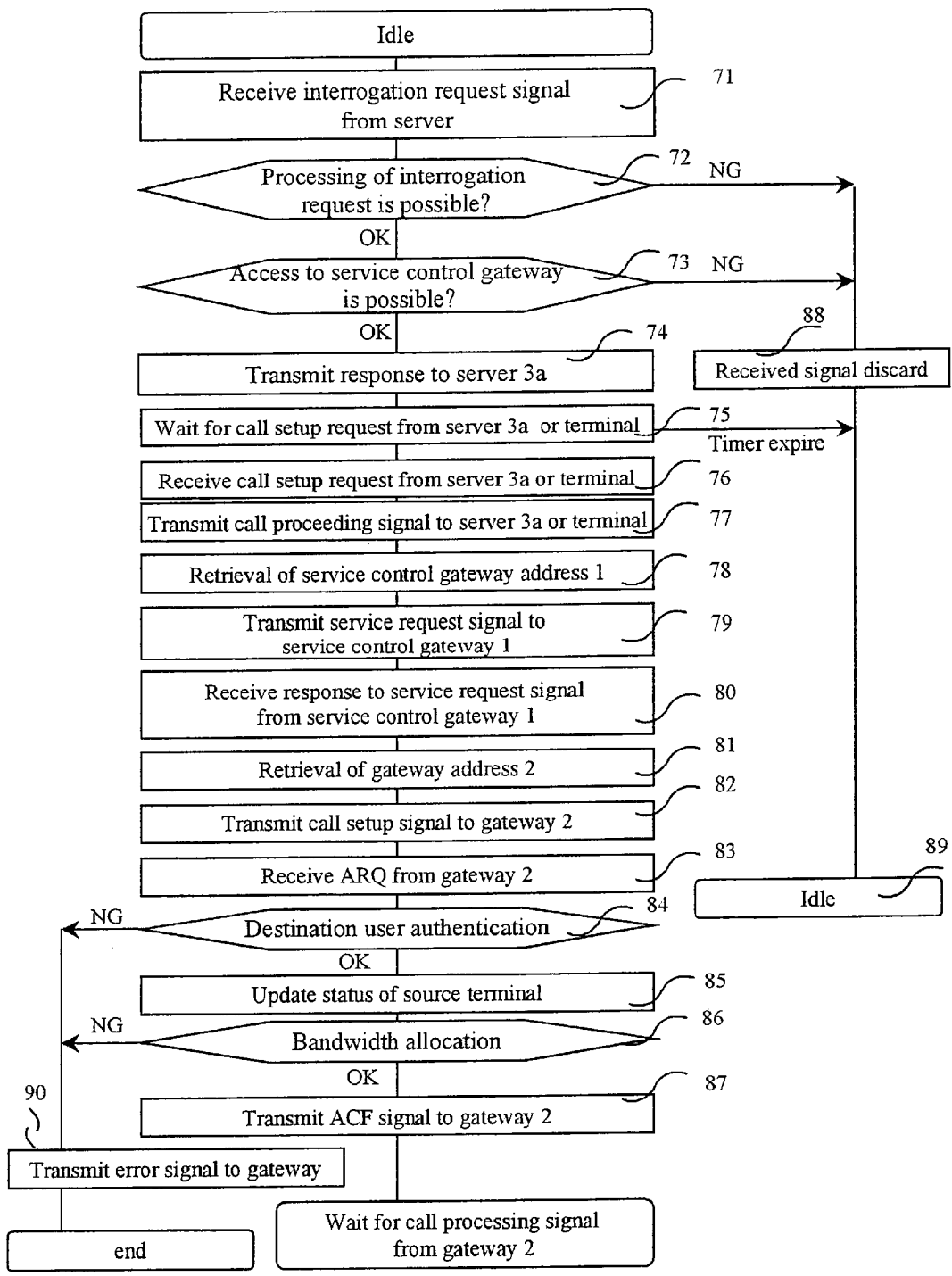
FIG. 6 is a flowchart showing processes executed by a server for managing a gateway connected to a transport layer in a telephone network and the IP network.

With reference to FIGS. 5 and 6, a processing flow of the server 3 in the case where a call is generated from a subscriber's terminal connected to the IP network to a subscriber's terminal connected to the telephone network and that in the case of providing services of the SCP 4 to subscriber's terminals connected to the IP network will be described. In FIGS. 5 and 6, a case in which a call is generated from the terminal 11 connected to the IP network 17 to the terminal 9a connected to the telephone network will be described as an example.

FIG. 5 shows a processing flow executed by the CPU 41 of the server 3a.

The processing flow is executed when a call is generated from a subscriber's terminal connected to the IP network to a subscriber's terminal connected to the telephone network.

The server 3a receives an admission request signal (ARQ) from the terminal 11 (step 51). Upon detection of the signal, the server 3a transfers the signal to the memory 42 via the communication interface 45 for the IP network and starts a signal receiving process by using a program stored in the memory. The server 3a analyzes information elements included in the received signal and determines whether a call from the user can be accepted or not (52).

In the case of receiving the call, from the identifiers of the source terminal 11 and the destination terminal 9a, the server 3a compares the areas where the terminals exist (53). When the terminals exist in the same area, the server 3a retrieves the IP address of the destination terminal 9a and the information of a channel which performs a call process by using the information stored in the memory 42 (64). The server 3a which has detected the necessary information updates the status of the source terminal 11 from "idle" to "busy" (61). The server 3a determines the bandwidth allocated to the call (62), transmits an admission confirm (ACF) signal to the source terminal 11, and finishes the routine (63). When there is no bandwidth to be allocated in step 62, an error signal is transmitted to the source terminal 11 (65).

When the area of the source terminal and that of the destination terminal are different from each other, the number of the destination terminal 9a is compared with the information stored in the memory 42 and the class of the destination terminal number is determined (54).

When the destination terminal number is in the class in which the address can be resolved from the information stored in the memory 42 (55), the IP address of the gateway corresponding to the destination terminal number or the IP address of the server which manages the gateway and the information of the channel for the call process are retrieved (64). Subsequently, a call setup process is performed in a manner similar to the case where the source and destination terminals exist in the same area.

In the case of a class in which the address cannot be resolved from the information stored in the memory 42 such as a case where an inquiry to the IN is necessary, first, a cache stored in the memory 42 is checked (56) to judge whether or not an interrogation has been sent to other servers for the class number resolution within a predetermined period in the past (57). When an interrogation has been sent to a server in the past predetermined period, the IP address of the server which responded at that time and the information of the channel for performing the call process are retrieved (64). When no interrogation has been sent within the past predetermined period and the resolution of the IP address of a proper server is impossible, by using the information prestored in the memory 42, an interrogation request is multicasted in order to obtain the address to the other servers 3b and 3c (58).

For example, the number (telephone number information such as an address specified by E.164) for identifying the destination terminal is included in the request signal. It is assumed that information associating the telephone number with the IP address is provided for each server by either a method of periodically exchanging information among servers and storing the information or a method of entering the information by a network operator when the service is started. It is assumed that information of the server to which communication can be performed from the server 3a is preset in the memory 42 in each server by the network operator or each server is registered in an IP multicast address.

FIG. 9 shows an example of an information table in the memory 42 in the server 3a. Destination number pattern 301 shows the pattern of destination number. This is compared with the destination terminal number received from the terminal and class 302 is determined. When the class 302 is that the address resolution is possible at the server 3a, the IP address of the corresponding server or the gateway 2 is written in the IP address 303. When the address resolution is impossible at the server 3a, a multicast address corresponding to the class is written. When the class 302 is that the address resolution is impossible at the server 3a and an interrogation using the multicast address has been succeeded in the past, the address of the server 3 used at that time is written in a cache 304. In the period of validity 305, the period of validity of the cache is written. When the clock of the system shows time after the period of validity, the data in the cache is not used.

Reference numerals 3011 to 3013 show examples of specific patterns. "?" denotes an arbitrary number from 0 to 9 and [1–8] denotes an arbitrary number from 1 to 8. 3011 shows an example of a pattern in which the address can be resolved inside. In this case, class 3021 is that "address resolution is possible at server 3a", so that the address of the server 3 or gateway 2 is written in the IP address 3031. Since the cache and the period of validity are not necessary, they are blank. 3012 and 3013 show examples of patterns in which the address cannot be resolved at the server. Since a plurality of cases such as 3022 and 3023 in which the address resolution is impossible at the server can be considered, it is necessary to cover all of patterns including the classes. In the IP addresses 3032 and 3033, multicast addresses corresponding to the classes are written. In each of cashes 3042 and 3043, the address of the server 3 which can access the service control gateway 1 that corresponded in the past is written. In each of the validity periods 3052 and 3053, the period of validity of the cache is written.

Referring again to FIG. 5, when the server 3 that has received the multicasted interrogation request determines that the call can be processed by itself from the information included in the interrogation request signal, the server 3 transmits an answer message including the information of the channel in which the call process is performed to the server 3a (59). The answer message includes information (correlation ID) indicating that the message is an answer to the interrogation request.

The server 3a which has received the answer message updates the cache (60) and updates the status of the source terminal 11 from "idle" to "busy" (61). The server 3a determines the bandwidth allocated to the call (62) transmits the admission confirm to the source terminal, and finishes the routine (63). When there is no bandwidth to be allocated, the server 3a transmits an error signal to the source terminal 11 (65).

FIG. 6 shows a processing flow executed by the CPU 41 of the server 3b.

When a call to a number that requires multicasting of an interrogation request is made from a terminal under the control of the server 3a to the server 3a, the server 3b receives the interrogation request from the server 3a (71). Information of the server as the interrogation request transmission source, which is stored in the memory 42 of the server 3b and can be accessed and the number of servers which have sent the interrogation request within a predetermined period are read, and whether the interrogation request can be processed or not is checked (72). Then whether the service control gateway 1 corresponding to the interrogation signal can be accessed or not is determined (73). When it is accessible, a response signal to the interrogation signal is transmitted to the server 3a (74). The response signal includes information (correlation ID) indicative of a response to the interrogation signal. The server 3b starts a timer and waits for a call setup request signal from a terminal managed by the server 3a or the server 3a (75).

When the call setup request signal including information of the destination number received first and the correlation ID is received from the server 3a or a terminal controlled by the server 3a within the predetermined period (76), a call processing signal is transmitted to the server 3a or the terminal controlled by the server 3a (77). Then it is determined from the destination number information that the service control gateway 1a has to be accessed, the address information is retrieved (78), and a service request signal is transmitted to the service control gateway 1a (79).

When the service request signal from the server 3b is received, the service control gateway 1a transmits the service request signal to the SCP 4. When a response signal to the service request signal is received from the SCP 4, the service control gateway 1a transmits a response signal to the service request from the server 3b to the server 3b (80). The response signal comprises number information including routing information to the destination terminal.

By using the routing information as a key, the server 3b retrieves the address information of the gateway which performs an interwork with the telephone interwork (81). The server 3b transmits a call setup request to the gateway (82). When the server 3b receives the admission request including correlating information between the call setup request and this admission request (correlation ID) from the gateway which has received the call setup request from the server 3b (83), the user authentication process is performed by using the information prestored in the memory 42 (84). When the authentication result is OK, the status of the terminal is updated from "idle" to "busy" (85) and the bandwidth is allocated to the call (86). When the bandwidth is allocated normally, an admission confirm (ACF) signal including the correlation ID is transmitted to the gateway (87) and the server 3b waits for a call processing signal from the gateway.

When the interrogation request from the server 3a cannot be processed in step 72 or when the access to the service control gateway 1a is refused in step 73, the received signal is discarded (88) and the server returns to the idle state (89).

When the call setup request signal including a proper correlation ID is not received from the server 3a or a terminal controlled by the server 3a within a predetermined period in step 75, the server returns to the idle state (89).

When the user authentication process is failed in step 84 or when the bandwidth cannot be allocated in step 86, an error signal is transmitted to the gateway and the routine is finished (90).

A method of transmitting a call from a terminal on an IP network to a terminal on a telephone network and a method of providing IN services on the telephone network to a terminal on an IP network will be described by using signal sequences shown in FIGS. 7 and 8, respectively.

Figure 7:
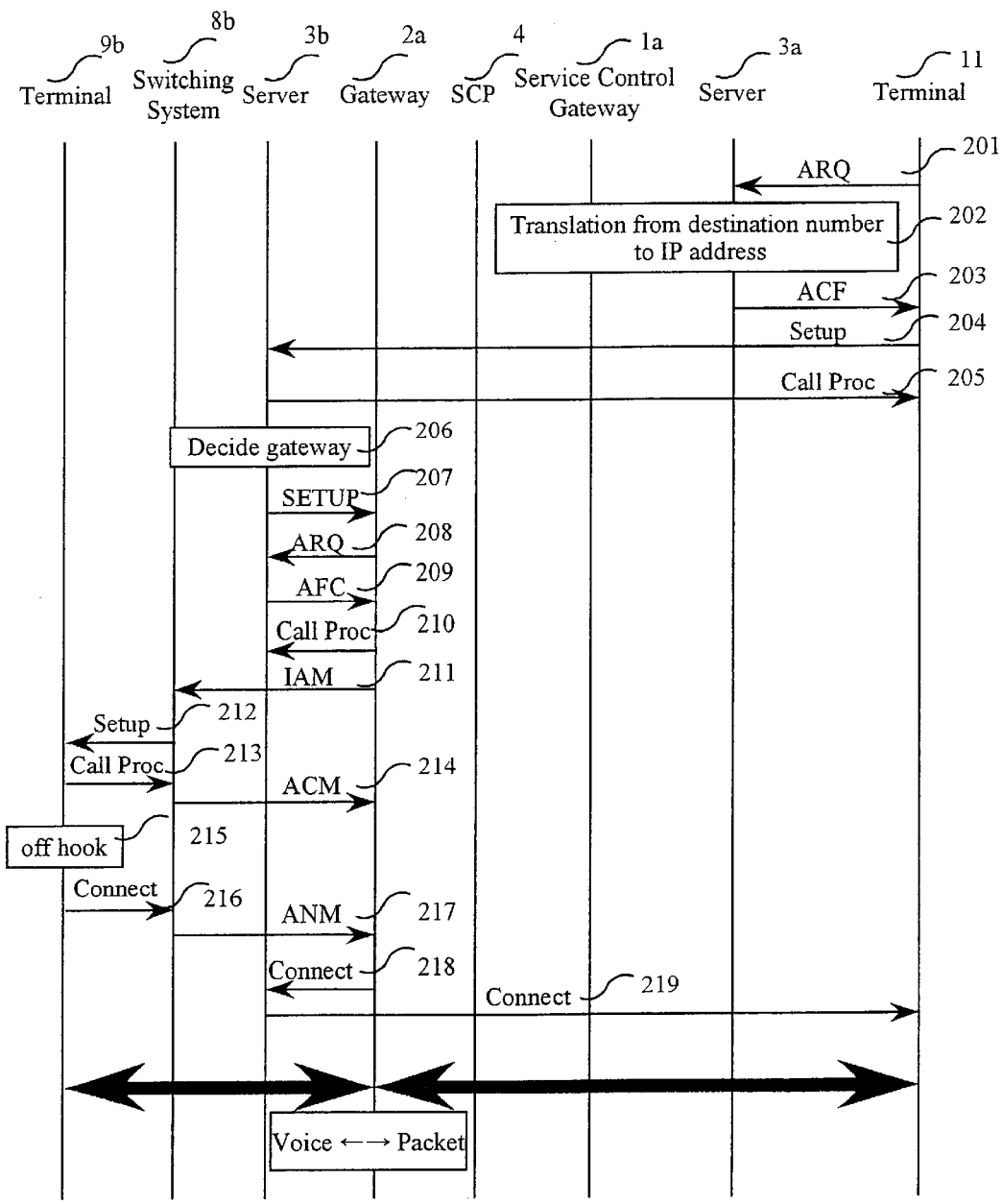
FIG. 7 is a signal sequence diagram showing a process flow of internet telephone in a network structure in which a public telephone network and the IP network are connected.
Figure 8:
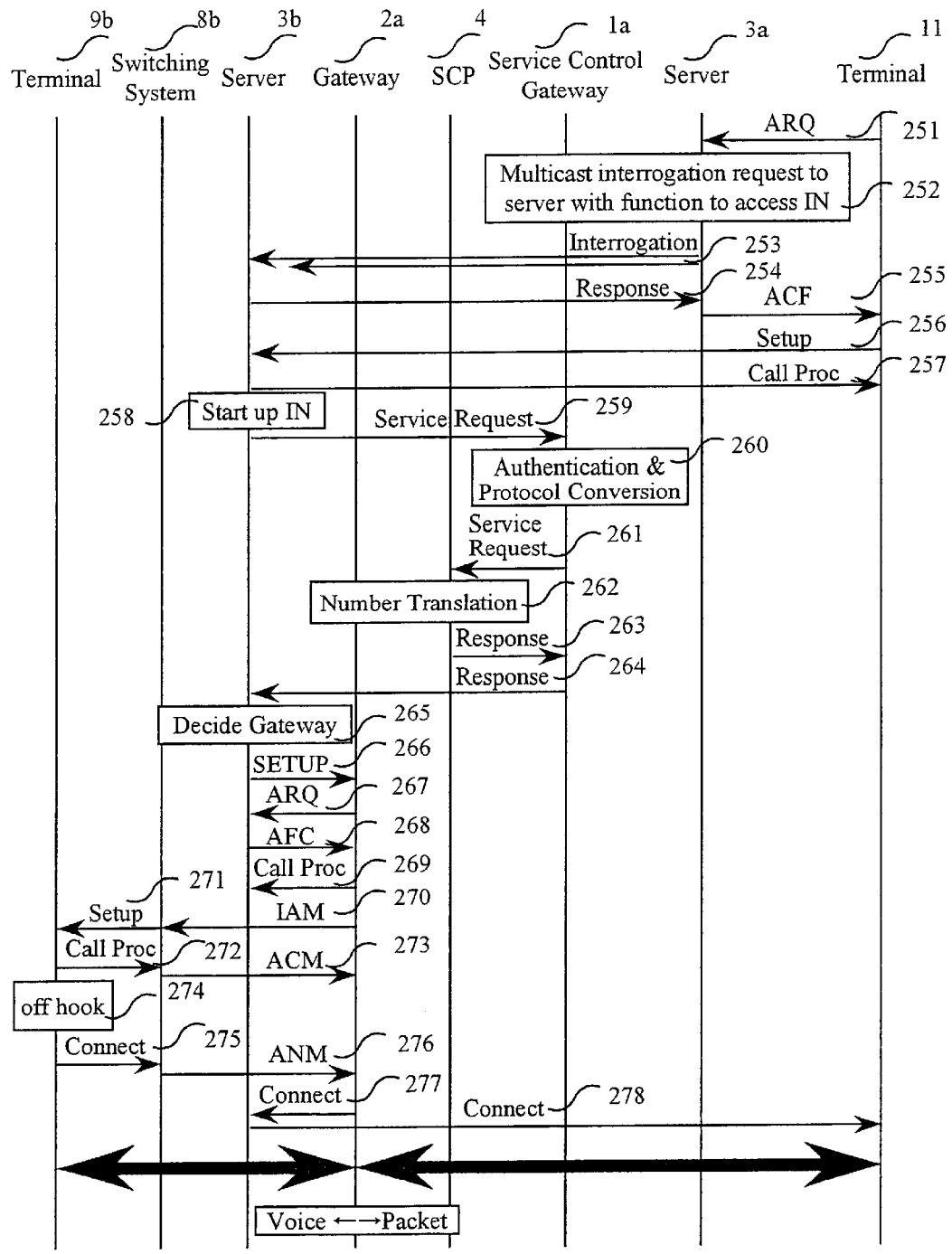
FIG. 8 is a signal sequence diagram showing the details of a service providing method in a network structure in which an intelligent network and the IP network are connected.

FIG. 7 is a signal sequence diagram of a case where a call is transmitted from the terminal 11 having the telephone function connected to the IP network to the terminal 9b connected to the public telephone network. It is assumed that the protocol specified by ITU-T H.323 is used for the communication between a server existing on the IP network and the terminal, between the server and a gateway, and between the terminal and the gateway.

It is assumed that the terminal 11 has registered for the server 3a for controlling the IP network 17 to which the terminal 11 belongs and obtained channel information (for example, port number of the TCP (transmission control protocol) or UDP (user datagram protocol)) used to exchange admission request or the like with the server 3a. When the terminal 11 generates a call, an admission request (ARQ) is sent to the server 3a by using the channel (201).

The server 3a which has received the admission request reads a program for executing the above-mentioned processing flow of FIG. 5 from a memory and executes the program. First, an authentication process is performed by using the identifier of the source terminal included in the received signal. The identifier of the source terminal included in the received signal is compared with destination number information to check whether the call set between them is a call in the same area or not. When the call is not made in the same area, the class of the destination number is checked by using the information prestored in the memory 42. In the case of the class in which the IP address of the server 3b controlling the gateway to which the destination terminal is connected is unconditionally determined from the destination number, the IP address of the server 3b and the information (such as port number of the TCP) used to transmit/receive the call process signal information are retrieved (202).

The server 3a updates the status of the source terminal, determines the bandwidth to be allocated to the call, and transmits an admission confirm (ACF) signal including the address information of the server 3b and the information of the bandwidth which can be used to the terminal 11 (203).

In order to transmit/receive the call process signal to/from the server 3b on the basis of the ACF, the terminal 11 sets up reliable connection such as TCP and then transmits a call setup request signal (Setup) to the server 3b (204) When the call is receivable, the server 3b which has received the signal transmits a call processing signal (Call Proc) to the terminal 11 (205).

The server 3b determines the IP address of the gateway 2a nearest to the destination terminal and information (such as port number of TCP) used to transmit/receive the call process signal information by using the information in the memory 42 from the destination number information included in the received call setup request signal (206). In order to transmit/receive the call process information between the server 3b and the gateway 2a, a reliable connection such as TCP is set up and a call setup request signal (Setup) is transmitted (207).

The gateway 2a which has received the call setup request signal transmits an admission request (ARQ) to request the authentication process and the bandwidth allocation to the server 3b (208). The server 3b performs the authentication process on the destination user, updates the status of the destination terminal from "idle" to "busy", allocates a bandwidth to the call, and transmits an admission confirm (ACF) signal including the useable bandwidth information to the gateway 2a (209).

The gateway 2a transmits a call processing signal (Cal Proc) to the server 3b (210) and transmits an initial address message (IAM) to the switching system 8b to which the destination terminal is connected by using the SS7 (18) (211)

The switching system 8b which has received the message transmits a call setup request signal (Setup) to the terminal 9b (212). When the call is acceptable, the call processing signal (Call Proc) is transmitted to the switching system 8b (213). In order to show that information necessary to set the call to the destination terminal is received, the switching system 8b transmits an address complete message (ACM) to the gateway 2a (214).

When the destination terminal is off-hooked (215), a connect signal (Connect) is transmitted from the terminal 9b to the switching system 8b (216). The switching system 8b transmits an answer message (ANM) to notify the gateway 2a that the destination user responded to the call (217). The gateway 2a transmits a connect signal (Connect) including transport address information (such as port number of the UDP) used to transfer voice information to the server 3b (218). The server 3b transmits the received connect signal (Connect) including the transport address information to the terminal 11 (219). By using the address information, voice can be transferred between the gateway 2a and the terminal 11 on the IP network by using, for example, the RTP (Real-Time Transport Protocol).

By executing the processing flow, for example, a call can be made from a terminal as a subscriber of internet telephone on an IP network to a terminal on the telephone network.

Although the example in which the server 3b transmits and receives the call process signal has been described in the sequence, when address information of the gateway 2a and the information used to transmit/receive the call process information is detected in step 202, the call process can be performed without using the server 3b.

A processing flow of the case where toll free services are used from a terminal on the IP network as a subscriber of internet telephone will be described in accordance with a signal sequence shown in FIG. 8. It is assumed that the protocol specified by ITU-T H.323 is used for the communication between a server and a terminal existing on the IP network, between the server and a gateway, and between the terminal and the gateway.

It is assumed that the terminal 11 has registered in the server 3a for controlling the IP network 17 to which the terminal 11 belongs and obtained channel information (for example, port number of the TCP or UDP) used to exchange admission request and the like with the server 3a. When the terminal 11 generates a call, first, an admission request (ARQ) is sent to the server 3a by using the channel (251). The server 3a which has received the admission request reads a program for executing the processing flow of FIG. 5 from a memory and executes the program.

First, an authentication process is performed by using the identifier of the source terminal included in the admission request from the server 3a. The identifier of the source terminal included in the received signal is compared with destination number information to check whether the call is made in the same area or not. When the call is not in the same area, the class of the destination number is checked by using the information prestored in the memory 42. In the case of the class in which the IP address of the server for controlling the gateway to which the destination terminal is connected is not unconditionally determined from the destination number, the information in the cache in the memory of the server 3a is retrieved. When the information related to the destination number is not included in the cache, an interrogation request is multicasted to a plurality of servers with the function of accessing the service control gateways 1 (1a, 1b) (252, 253).

The server 3b (or 3c) which has received the interrogation request reads a program for executing the processing flow shown in FIG. 6 from the memory 42 and executes it.

First, the process of authenticating the server which has sent multicasted interrogation request is performed. When it is determined that the service control gateway 1a can be accessed, an answer message including address information (such as port number of the TCP) used to transmit/receive the call process signal of the server 3b to the server 3a (254) and the server 3b waits for a call setup request signal (Setup) from the terminal 11 or the server 3a. The server 3a updates the status of the terminal 11 from "idle" to "busy", determines the bandwidth to be allocated to the call, and transmits admission confirm (ACF) including the address information used to transmit/receive the call process signal received from the server 3b to the terminal 11 (255).

In order to transmit/receive the call process signal to/from the server 3b on the basis of the received information, the terminal 11 sets up reliable connection such as the TCP and then transmits a call setup request signal (Setup) to the server 3b (256). When the call can be received, the server 3b which has received the signal transmits a call processing signal (Call Proc) to the terminal 11 (257).

The server 3b determines that the call requires an access to the SCP by using the information in the memory from the destination number information included in the received call setup request signal (258), determines the IP address of the service control gateway 1a from the destination number, and transmits the service request signal to the service control gateway 1a (259).

After performing the server authentication process, when the SCP 4 can be accessed, the service control gateway 1a converts a low-order protocol so that the received signal can be transferred by the SS7 (18) and transmits the service request signal to the SCP 4 (261).

The SCP 4 which has received the service request starts the IN service process program, translates logical number starting from, for example, 0120 to physical number to enable routing to the terminal corresponding to the logical number to be performed (262), and transmits an answer message including the translated number to the server 3b via the service control gateway 1a (263, 264).

The server 3b determines the IP address of the gateway 2a which is the closest to the number used for the routing in the telephone network included in the answer message 264 and information (such as port number of TCP) used to transmit/receive the call process signal information (265). The subsequent processes are similar to those of step 207 and subsequent steps in FIG. 7. In order to transmit/receive the call process signal information between the server 3b and the gateway 2a, a reliable connection such as the TCP is set up and a call setup request signal (Setup) is transmitted (266).

The gateway 2a which has received the call setup request signal transmits an admission request (ARQ) to request the authentication process and the bandwidth allocation to the server 3b (267). The server 3b performs the authentication process on the terminal indicated by the routing number, updates the status of the destination terminal from "idle" to "busy", allocates the bandwidth to the call, and transmits an admission confirm (ACF) signal including the useable bandwidth information to the gateway 2a (268).

The gateway 2a transmits a call processing signal (Cal Proc) to the server 3b (269) and transmits an initial address message (IAM) to the switching system 8b to which the destination terminal is connected by using the SS7 (18) (270).

The switching system 8b which has received the message transmits a call setup request signal (Setup) to the terminal 9b (271). When the call can be received, the terminal transmits a call processing signal (Call Proc) to the switching system 8b (272). In order to show that information necessary to set up the call to the destination terminal is received, the switching system 8b transmits an address complete message (ACM) to the gateway 2a (273).

When the destination terminal is off-hooked (274), a connect signal (Connect) is transmitted from the terminal 9b to the switching system 8b (275). The switching system 8b transmits an answer message (ANM) to the gateway 2a to notify that the destination user responded to the call (276). The gateway 2a transmits a connect signal (Connect) including transport address information (such as port number of the UDP) used to transfer voice information to the server 3b (277). The server 3b transmits a connect signal (Connect) including the transport address information in the received connect signal to the terminal 11 (278). By using the address information, voice can be transferred between the gateway 2a and the terminal 11 on the IP network by using, for example, the RTP (Real-Time Transport Protocol).

By executing the processing flow, for example, services provided by using the IN can be used from a terminal as a subscriber of internet telephone on an IP network.

A method of obtaining information which cannot be translated by the IP address—telephone number correspondence information in the server by multicasting an interrogation request to other more intelligent servers will now be described.

Figure 10:
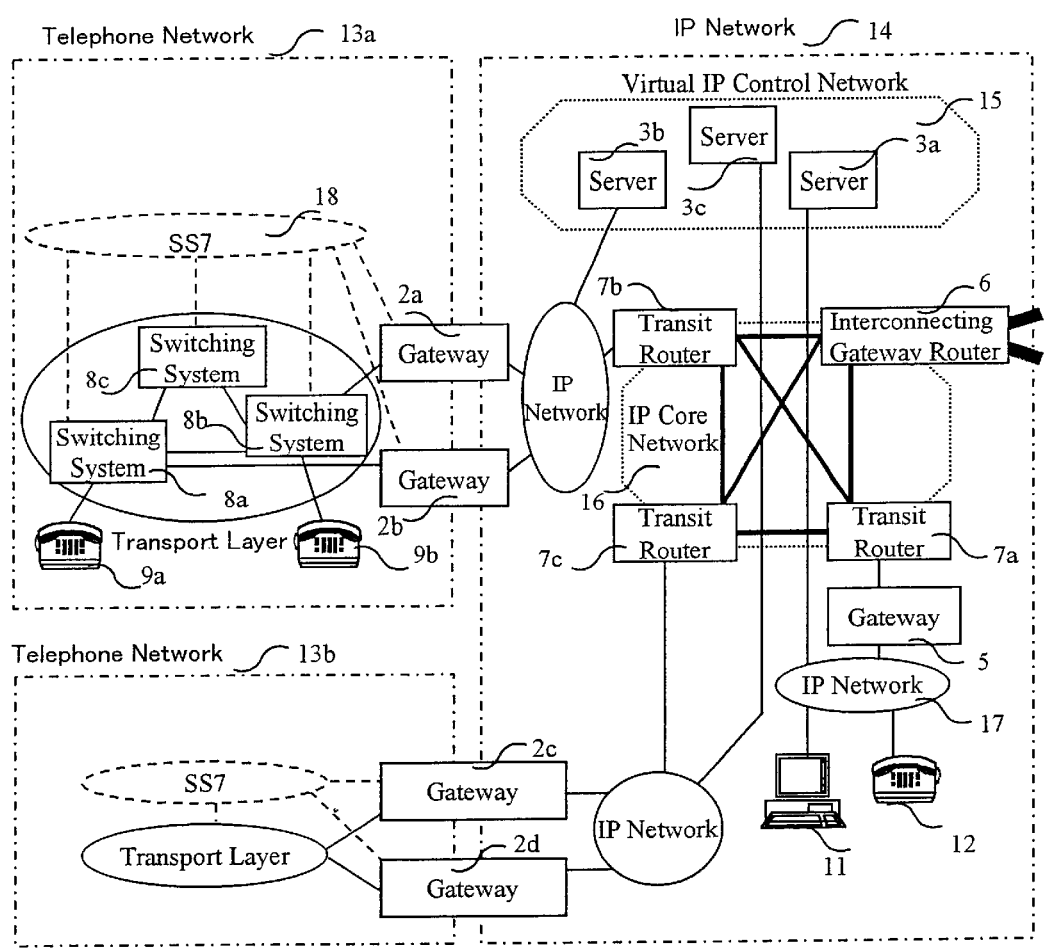
FIG. 10 is a diagram showing another network structure in which existing telephone networks and the IP network are connected.

FIG. 10 shows an example of the structure in which the existing telephone networks 13 (13a, 13b) and the IP network 14 are connected, to which the invention is applied. A difference from FIG. 1 is that the intelligent network and the service control gateway are omitted because they are not necessary to explain the method. The intelligent network may exist in practice.

Figure 11:
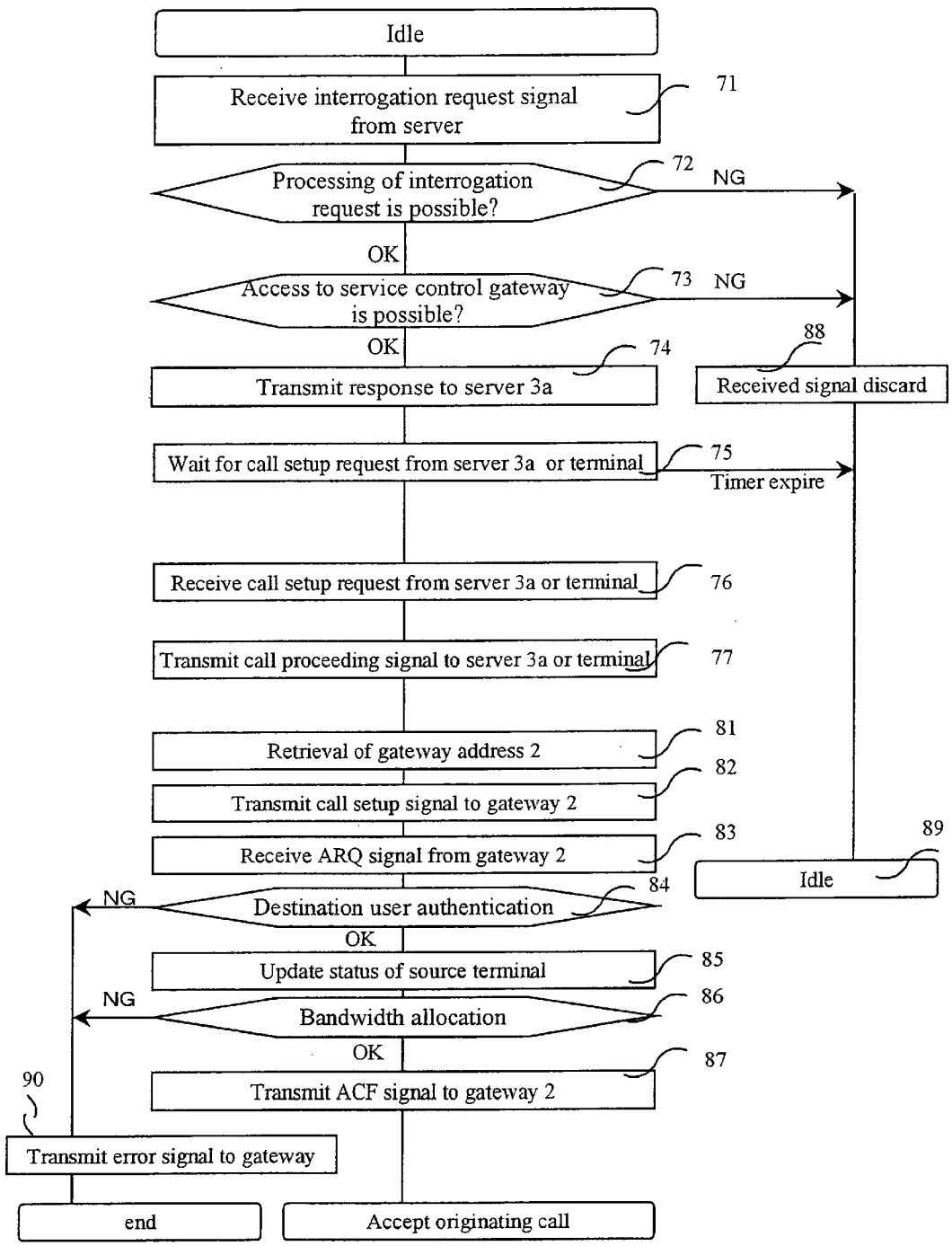
FIG. 11 is a flowchart showing other processes executed by the server for managing the gateway connected to the transport layer in the telephone network and the IP network.

FIG. 11 shows the processing flow executed by the CPU 41 of the server 3b. The difference from FIG. 6 is that no communication with the service control point via the service control gateway exists. The processing flow executed by the CPU 41 of the server 3a is basically unchanged.

Figure 12:
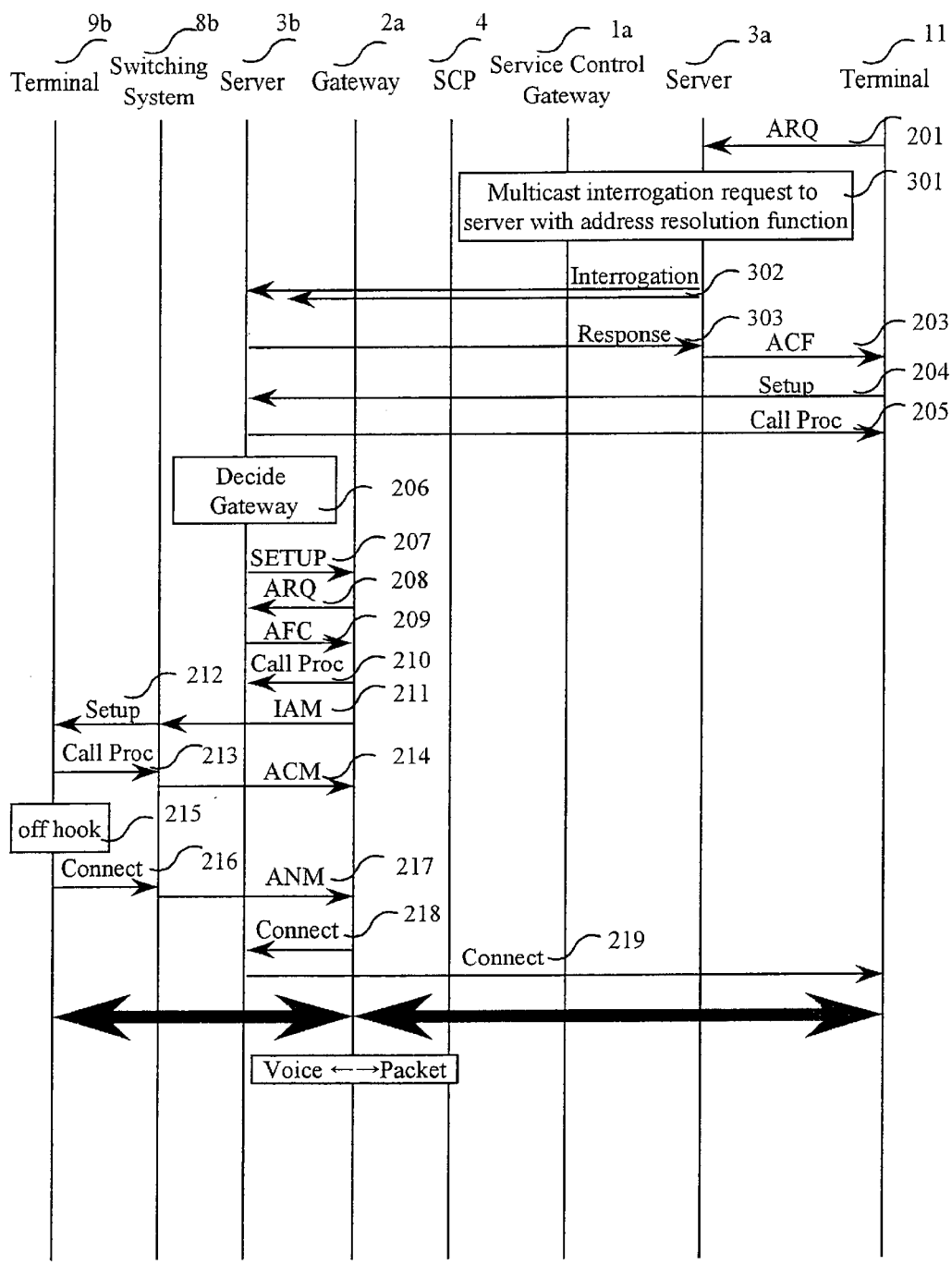
FIG. 12 is a signal sequence diagram showing a process flow of the internet telephone in the network structure in which the public telephone network and the IP network are connected.

FIG. 12 shows a signal sequence used when a call is generated from the terminal 11 having the telephone function connected to the IP network to the terminal 9b connected to the public telephone network. The difference from FIG. 7 is that, since the destination number cannot be translated to the IP address of the server 3b (202), an interrogation request is multicasted to servers which can resolve the IP address (301, 302) and the ACF 203 is transmitted from the server 3a to the terminal on the basis of the result.

By executing the above processing flow, a call can be made from the terminal 11 also to telephone number which does not exist in the IP address—telephone number correspondence information in the server 3a.

According to the invention, when the telephone service realized by the linkage of the IP network such as Internet and the public network is used, services provided by a service control point of an intelligent network can be efficiently used and the number of kinds of telephone services realized by the linkage of the IP network and the public telephone network can be increased. A communication enterprise having the service control point can enlarge the service usable range.

Since all the servers do not have to have the complete IP address—telephone number translation information, the connectability of the IP telephone can be assured irrespective of the performance of the server.

Although the present invention has been described in connection with preferred embodiments thereof, many other variations and modifications will now become apparent to those skilled in the art.

What is claimed is:

1. A communication method, at an IP network subscriber's terminals management server of a network including:

a plurality of telephone networks each having a plurality of switching systems to which telephone network subscriber's terminals are connected;

an internet protocol (IP) network;

a plurality of gateways connected to the plurality of telephone networks and the IP network, for IP encapsulating voice and for translating IP encapsulated voice to voice;

a plurality of IP network subscriber's terminals connected to the IP network;

a plurality of gateway management servers connected to the IP network, for managing the plurality of gateways; and the IP network subscriber's terminals management server connected to the IP network, for managing the plurality of IP network subscriber's terminals, the method comprising the steps of:

receiving an admission request from one of said IP network subscriber's terminals, the admission request including a destination number corresponding to any of the plurality of telephone network subscriber's terminals from any of the plurality of IP network subscriber's terminals;

judging the kind of the destination number indicated in the admission request;

retrieving an address of one of said gateways and said gateway management servers by referring to a table according to the destination number, said table indicating an address of one of the plurality of gateways to be communicated in order to originate a call from the IP network subscriber terminal to the destination number if the destination number is of a first kind, and indicating a multicast address for communicating a group of gateway management servers determined depending on the destination number in order to interrogate an address of a gateway to be communicated later if the destination number is of a second kind;

said table being stored in the subscriber's terminals management server, and comprising a plurality of entries each indicating a destination terminal number, class of the destination terminal number and an IP address of one of the gateways or a multicast address determined in accordance with the class, notifying the IP network subscriber's terminal of the address of a gateway corresponding to the destination number when the destination number received is of the first kind;

multicasting an interrogation request to a group of gateway management servers according to the multicast address corresponding to the destination number when the destination number received is of the second kind; and notifying the IP network subscriber's terminal of the address of one of the gateway management servers when a response to the interrogation request is received from the gateway management server.

2. A communication control method according to claim 1, further comprising the steps of:

holding the address of the gateway management server which has transmitted the response into a storage; and notifying one of the IP network subscriber's terminals of the address of the gateway management server held in the storage when an admission request including the destination number of the second kind is received from the plurality of IP network subscriber's terminal.

3. An IP network subscriber's terminals management server for a communication network including at least:

a first telephone network comprised of a first transport layer and a first intelligent layer, the first transport layer being comprised of a plurality of switching systems to each of which first telephone network subscriber's terminals are connected, the first intelligent layer having a first service control point for controlling services to be provided to the first telephone network subscriber's terminals and being connected to the first transport layer via a first signalling network;

a second telephone network comprised of a second transport layer and a second intelligent layer, the second transport layer being comprised of a plurality of switching systems to each of which second telephone network subscriber's terminals are connected, the second intelligent layer having a second service control point for controlling services to be provided to the second telephone network subscriber terminals and being connected to the second transport layer via a second signalling network;

an internet protocol (IP) network;

a first gateway connected between the first telephone network and the IP network, for IP encapsulating voice and translating IP encapsulated voice into voice;

a second gateway connected between the second telephone network and the IP network, for IP encapsulating voice and translating IP encapsulated voice into voice;

a plurality of IP network subscriber's terminals connected to the IP network;

a first gateway management server connected to the IP network for managing the first gateway;

a second gateway management server which is connected to the IP network for managing the second gateway;

a first service control gateway connected to the first intelligent network and the first gateway management server, capable of performing protocol conversion between a protocol used in the first signalling network and the IP and requesting the first service control point to provide services according to a request from the first gateway management server; and a second service control gateway connected to the second intelligent network and the second gateway management server, capable of performing protocol conversion between a protocol used in the second signalling network and the IP and requesting the second service control point to provide services according to a request from the second gateway management server, the IP network subscriber's terminals management server being connected to the IP network for managing the plurality of IP network subscriber's terminals and comprising a controller, a memory and a communication interface connected to the IP network, wherein the memory includes a table in which: the address of either the first gateway management server or the second gateway management server is designated in association with destination number patterns of a first kind which do not require an access to the first or second service control point; and a multicast address for communicating with the first and second gateway management servers is designated in association with destination number patterns of a second kind which require an access to the first or second service control point in order to receive services provided by the first or second service control point, and the controller responds to an admission request from any of the IP network subscriber's terminal by judging the kind of a destination number designated in the admission request according to the table and by selectively communicating with the first and second gateway management servers depending on the kind of the destination number, thereby to specify one of the first and second gateway management servers as a server to be accessed by the IP network subscriber's terminal to request a call setup, wherein said multicast address is registered in the table in with a class of the destination terminal number.

4. An IP network subscriber's terminals management server according to claim 3, wherein the controller comprises:

first means for referring to the table in the memory when the communication interface receives an admission request including a destination number corresponding to one of the first and second telephone network subscriber's terminal from any of the plurality of IP network subscriber's terminals, to judges the kind of the destination number;

second means for notifying the IP network subscriber's terminal of the address of either the first or second gateway management server whose destination number pattern defined in the table corresponds to the destination number in the admission request when the received destination number is of the first kind, third means for multicasting an interrogation request to the first and second gateway management servers when the destination number is of the second kind, and notifying, when a response signal to the interrogation request is received from either the first or second gateway management server, the IP network subscriber's terminal of the address of the gateway management server which has sent the response signal.

5. An IP network subscriber's terminals management server according to claim 4, wherein:

the controller further comprises fourth means for storing the address of the gateway management server, which has transmitted the response signal, into a cache area of a table entry in association with the destination address pattern in the table, and said first means notifies one of the IP network subscriber's terminals of the address of the gateway management server held in the cache area when an admission request regarding the destination number of the second kind is received thereafter from the IP network subscriber's terminal.

6. An IP network subscriber's terminals management server for a communication network including:

a plurality of telephone networks each having a plurality of switching systems to which telephone network subscriber's terminals are connected;

an internet protocol (IP) network;

a plurality of gateways connected to the plurality of telephone networks and the IP network, for IP encapsulating voice and for translating IP encapsulated voice to voice;

a plurality of IP network subscriber's terminals connected to the IP network; and a plurality of gateway management servers connected to the IP network, for managing the plurality of gateways; the IP network subscriber's terminals management server being connected to the IP network for managing the plurality of IP network subscriber's terminals and comprising a controller, a memory and a communication interface connected to the IP network, wherein the memory includes a table for indicating an address of one of the plurality of gateways to be connected with one of the IP network subscriber's terminals when the terminal originates a call to one of the telephone network subscriber's terminals having a destination number corresponding to a first kind of destination number patterns, and a multicast address for communicating a group of gateway management servers in order to interrogate an address of a gateway to be connected with one of the IP network subscriber's terminals when the terminal originates a call to one of the telephone network subscriber's terminals having a destination number corresponding to a second kind of destination number patterns, and the controller responds to an admission request from any of the IP network subscriber's terminal by judging the kind of a destination number designated in the admission request according to the table and by selectively communicating with the group of gateway management servers depending on the kind of the destination number, thereby to specify one of the gateway or one of the gateway management servers as a server to be accessed by the IP network subscriber's terminal to request a call setup, wherein said multicast address is registered in the table in association with a class of the destination terminal number so that different group of gateway management servers can be interrogated depending on the class.

7. An IP network subscriber's terminals management server according to claim 6, wherein the controller comprises:

first means for referring to the table in the memory when the communication interface receives an admission request including a destination number to judge the kind of the destination number second means for notifying the IP network subscriber's terminal of the address of a gateway whose destination number pattern defined in the table corresponds to the destination number in the admission request when the destination number has the first kind of destination number pattern, third means for multicasting an interrogation request to the plurality of gateway management servers when the destination number has the second kind of destination number pattern, and notifying, when a response signal to the interrogation request is received from any of the plurality of gateway management servers, the IP network subscriber's terminal of the address of the gateway management server which has sent the response signal.

8. An IP network subscriber's terminals management server according to claim 7, wherein the controller further comprises fourth means for holding the address of the gateway management server, which has transmitted the response signal, into a cache area of a table entry corresponding to destination number pattern in the table, and said first means notifies one of the IP network subscriber's terminals of the address of the gateway management server held in the cache area when an admission request regarding the destination number of the second kind is received thereafter from the IP network subscriber's terminal.

* * * * *